United States Patent
Sun

(10) Patent No.: US 12,225,631 B2
(45) Date of Patent: Feb. 11, 2025

(54) METHOD AND APPARATUS FOR ALLOCATING UE IDENTIFIER, AND COMPUTER-READABLE STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Junshuai Sun, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 373 days.

(21) Appl. No.: 17/772,048

(22) PCT Filed: Sep. 25, 2020

(86) PCT No.: PCT/CN2020/117841
§ 371 (c)(1),
(2) Date: Apr. 26, 2022

(87) PCT Pub. No.: WO2021/082833
PCT Pub. Date: May 6, 2021

(65) Prior Publication Data
US 2022/0408242 A1    Dec. 22, 2022

(30) Foreign Application Priority Data
Oct. 29, 2019   (CN) .......................... 201911040502.6

(51) Int. Cl.
*H04W 8/26*    (2009.01)
*H04W 8/08*    (2009.01)

(52) U.S. Cl.
CPC ............... *H04W 8/26* (2013.01); *H04W 8/08* (2013.01)

(58) Field of Classification Search
CPC ..... H04L 61/10; H04L 61/50; H04L 61/3015; H04W 8/02; H04W 8/08; H04W 8/14;
(Continued)

(56) References Cited

U.S. PATENT DOCUMENTS 10,334,642 B2 *  6/2019  Zhu ....................... H04W 48/20
10,674,421 B2 *  6/2020  Jin ........................ H04W 48/18
(Continued)

FOREIGN PATENT DOCUMENTS

| CN | 1664798 A | 9/2005 |
| CN | 101213799 A | 7/2008 |

(Continued)

OTHER PUBLICATIONS

ETSI TS 138 401, 5G; NG-RAN; Architecture description (3GPP TS 38.401 version 15.6.0 Release 15), V15.6.0 (Jul. 2019), 48 pages, Jul. 2019.*

(Continued)

*Primary Examiner* — Frank Duong
(74) *Attorney, Agent, or Firm* — Cooper Legal Group, LLC

(57) ABSTRACT

Embodiments of the present invention provide a method and apparatus for allocating a User Equipment (UE) identifier, and a computer readable storage medium. The method comprises: a preset functional entity or module allocates a UE identifier; the UE identifier is associated with an iden- (Continued)

tifier of the UE in a wireless network system for information interaction between a network side device and the preset functional entity or module.

18 Claims, 10 Drawing Sheets

(58) Field of Classification Search
CPC ............... H04W 8/26; H04W 36/0005; H04W 36/0011; H04W 36/0016; H04W 36/0019; H04W 36/0022; H04W 36/00222; H04W 36/0033; H04W 36/0061; H04W 48/16
See application file for complete search history.

(56) References Cited

U.S. PATENT DOCUMENTS

| | | | |
|---|---|---|---|
| 11,464,056 B2* | 10/2022 | Song | ............... H04W 8/26 |
| 2015/0304988 A1 | 10/2015 | Jin | |
| 2018/0220478 A1 | 8/2018 | Zhu et al. | |
| 2019/0014525 A1 | 1/2019 | Jin et al. | |
| 2019/0110190 A1 | 4/2019 | Van Lieshout et al. | |
| 2019/0191330 A1* | 6/2019 | Dao | ............... H04L 12/4633 |
| 2020/0053165 A1 | 2/2020 | Li et al. | |
| 2021/0184989 A1* | 6/2021 | Wu | ............... H04L 47/822 |
| 2021/0258866 A1* | 8/2021 | Chou | ............... H04W 48/16 |

FOREIGN PATENT DOCUMENTS

| | | |
|---|---|---|
| CN | 101772027 A | 7/2010 |
| CN | 101917470 A | 12/2010 |
| CN | 102546596 A | 7/2012 |
| CN | 103052063 A | 4/2013 |
| CN | 103491527 A | 1/2014 |
| CN | 103502272 A | 1/2014 |
| CN | 106332064 A | 1/2017 |
| CN | 107925904 A | 4/2018 |
| CN | 109756900 A | 5/2019 |
| EP | 1790128 A1 | 5/2007 |
| EP | 3422752 A1 | 1/2019 |
| EP | 3565371 A1 | 11/2019 |
| WO | 2014101230 A1 | 7/2014 |
| WO | 2019017836 A1 | 1/2019 |

OTHER PUBLICATIONS

ETSI TS 138 413, 5G; NG-RAN; NG Application Protocol (NGAP) (3GPP TS 38.413 version 15.0.0 Release 15), V15.0.0 (Jul. 2018), 256 pages, Jul. 2018.*
International Search Report in the international application No. PCT/CN2020/117841, mailed on Dec. 21, 2020, 2 pgs.
English translation of the Written Opinion of the International Search Authority in the international application No. PCT/CN2020/117841, mailed on Dec. 21, 2020, 3 pgs.
"Look at the Architecture: ORAN is not a Simple Organization!", Apr. 2018, Communication Industry News, No. 8, 7 pgs.
"Improved Collaborative Filtering Algorithm Based on Association Rules", Mar. 2019, Xiaochuan Zhang, Zehong Zhou, Nan Xiang and Ruiting Sang, Journal of Chongqing University of Technology (Natural Science), vol. 33. No. 3, 8 pgs.
"New WID on 5G Media Streaming Architecture", Dec. 2018, Source: Ericsson L.M., Sansung Electronics Co., Ltd. et al. 3GPP TSG SA Meeting #82, TD SP-181217, Sorrento, Italy, 3 pgs.
"Design and Implementation of High Lift System Software Based on SCADE", Apr. 2019, Li Guocai et al., International Conference, CNKI, 5 pgs.
"5G RAN Optimization using the O-RAN Software Community's RIC (Ran Intelligent Controller)", Sep. 2019, Thoralf Czichy,Open Networking Summit Europe, pp. 1-23, XP055697834, Antwerp, Belgium.
"O-RAN Working Group 2 (Non-RT RIC & A1 interface), Jun. 2019, ORAN-WG2. Use Case Requirements v01.00", O-RAN Specifications, O-RAN, 1 Jpages 1-29, XP009528794, Retrieved from the Internet: URL: https://www.o-ran.org/specifications.
Supplementary European Search Report in the European application No. 20881343.6, mailed on Nov. 4, 2022, 10 pgs.

* cited by examiner

METHOD AND APPARATUS FOR ALLOCATING UE IDENTIFIER, AND COMPUTER-READABLE STORAGE MEDIUM

CROSS-REFERENCE TO RELATED APPLICATION

The present application is based upon and claims priority to Chinese Patent Application No. 201911040502.6, filed on Oct. 29, 2019, the disclosure of which is hereby incorporated by reference in its entirety.

TECHNICAL FIELD

The disclosure relates to the technical field of mobile communications, and in particular, to a method and apparatus for allocating a User Equipment (UE) identifier, and a computer-readable storage medium.

BACKGROUND

A User Equipment/terminal Identifier (UE Identifier) in a 5G system has different presentation forms in different network elements. In order to identify a UE Identification (UE ID), multiple terminal identifiers may be used.

It can be seen from user identifiers defined by 3GPP that each UE identifier has a usage range and involves UE security issues, e.g.: if a C-RNTI is obtained by a system outside a base station, user data may be intercepted at an air interface for monitoring.

A function entity or module at a Core Network (CN) or a Radio Access Network (RAN) needs to identify a UE, but the network side needs to ensure the security of UE context information. Each identifier associated with a UE defined by 3GPP or a UE ID is either related to the security of the UE context information or is a local ID, which cannot satisfy the usage by the function entity or module among multiple base stations covered thereby.

SUMMARY

In view of this, embodiments of the disclosure are expected to provide a method and apparatus for allocating a UE identifier, and a computer-readable storage medium.

In order to achieve the above object, the technical solutions of the embodiments of the disclosure are implemented as follows.

Embodiments of the disclosure provide a method for allocating a UE identifier, which may include the following operations.

A preset function entity or module allocates a UE ID.

The UE ID is associated with the identifier of the UE in a radio network system for information interaction between a network device and the preset function entity or module.

The preset function entity or module at least includes:
a near Real Time Radio Intelligent Controller (nRT RIC), and/or a non Real Time Radio Intelligent Controller (non-RT RIC) (NRT RIC), and/or other function entities or modules capable of allocating a UE ID.

Optionally, before the preset function entity or module allocates the UE ID, the method may further include the following operations.

A UE identifier request sent by the network device is received.

The request carries an identifier of the UE in the radio network system.

Optionally, the method may further include the following operations.

The identifier of the UE in the radio network system sent by the network device is received and stored.

Or, an updated identifier of the UE in the radio network system sent by the network device is received and stored.

Optionally, the method may further include the following operations.

A deletion request sent by the network device is received.

The deletion request is used for notifying the preset function entity or module to delete relevant information about the identifier of the UE in the radio network system.

The UE ID remains unchanged within a coverage of the radio network system managed or controlled by the preset function entity or module.

When the identifier of the UE in the radio network system is changed, the UE ID is associated with an updated identifier.

The operation that a preset function entity or module allocates a UE ID includes the following operations.

The preset function entity or module determines whether the UE is allocated with the UE ID based on the identifier of the UE in the radio network system. If no, a UE ID is allocated and sent to the network device. If yes, the allocated UE ID is sent, and the identifier of the UE in the radio network system is recorded.

The operation that a preset function entity or module allocates a UE ID includes the following operations.

The nRT RIC determines whether the UE has been allocated with the UE ID according to the identifier of the UE in the radio network system. If the UE is not allocated with the UE ID, a UE ID is allocated. If the UE has been allocated with the UE ID, the allocated UE ID is used.

The nRT RIC records the identifier of the UE in the radio network system, and sends the UE ID and the identifier of the UE in the radio network system to the NRT RIC together.

The length of the UE ID is determined according to the total number of UEs needing to be supported by the preset function entity or module; or, a two-level ID recording mode is adopted.

Embodiments of the disclosure also provide a method for allocating a UE identifier, which may include the following operations.

A network device receives an allocated UE ID.

The UE ID is associated with an identifier of a UE in a radio network system for information interaction between the network device and a preset function entity or module.

Before the network device receives the allocated UE ID, the method may further include the following operations.

A UE identifier request is sent to the preset function entity or module.

The request carries an identifier of the UE in the radio network system.

Optionally, the method may further include the following operations.

The identifier of the UE in the radio network system is sent to the preset function entity or module.

Or, an updated identifier of the UE in the radio network system is sent to the preset function entity or module.

Optionally, the method may further include the following operations.

A deletion request is sent to the preset function entity or module when it is determined that the UE is deleted.

The deletion request is used for notifying the preset function entity or module to delete relevant information about the identifier of the UE in the radio network system.

Optionally, the method may further include the following operations.

The UE ID is mapped or bound to the identifier of the UE in the radio network system.

Or, the UE ID is mapped or bound to an updated identifier of the UE in the radio network system.

Embodiments of the disclosure also provide an apparatus for allocating a UE identifier, which may include an allocation module and a first processing module.

The allocation module is configured to allocate, by a preset function entity or module, a UE ID. The UE ID is associated with an identifier of a UE in a radio network system for information interaction between a network device and the preset function entity or module.

The first processing module is configured to realize the information interaction between the network device and the preset function entity or module.

Embodiments of the disclosure also provide an apparatus for allocating a UE identifier, which may include a first receiving module and a second processing module.

The first receiving module is configured to receive, by a network device, an allocated UE ID. The UE ID is associated with an identifier of a UE in a radio network system for information interaction between the network device and a preset function entity or module.

The second processing module is configured to realize the information interaction between the network device and the preset function entity or module.

Embodiments of the disclosure also provide an information processing apparatus, which may include: a processor and a memory for storing a computer program executable on the processor.

The processor, when executing the computer program, performs the steps of the above methods.

Embodiments of the disclosure also provide a computer-readable storage medium having a computer program stored thereon. The computer program, when executed by a processor, implements the steps of the above methods.

Embodiments of the disclosure provide a method and apparatus for allocating a UE identifier, and a computer-readable storage medium. A preset function entity or module (e.g. $FA_{outside}$) allocates a UE ID (e.g. FA UE ID). The UE ID is associated with an identifier of a UE in a radio network system for information interaction between a network device and the preset function entity or module. In the embodiments of the disclosure, a UE ID is associated with an identifier of a UE in a radio network system, so as to achieve decoupling of the UE ID from a specific network system. By means of a unified UE ID, information between a network device and the preset function entity or module may be conveniently and clearly associated, thereby avoiding the use of a complicated UE ID or identifier in the radio network system.

In addition, when the identifier of the UE in the radio network system is changed, the UE ID is not changed, and only needs to be bound to an updated identifier of the UE in the radio network system.

It can be seen that an independent UE ID in the embodiments of the disclosure not only avoids the security impact caused by a UE identifier allocated by the radio network system being sent out of the system, but also avoids the frequent handover caused by the locality of the UE identifier allocated by the radio network system (e.g. one cell needs to be changed, one base station needs to be changed once, etc.).

DETAILED DESCRIPTION

The disclosure will be described below with reference to the accompanying drawings and embodiments.

Figure 1:
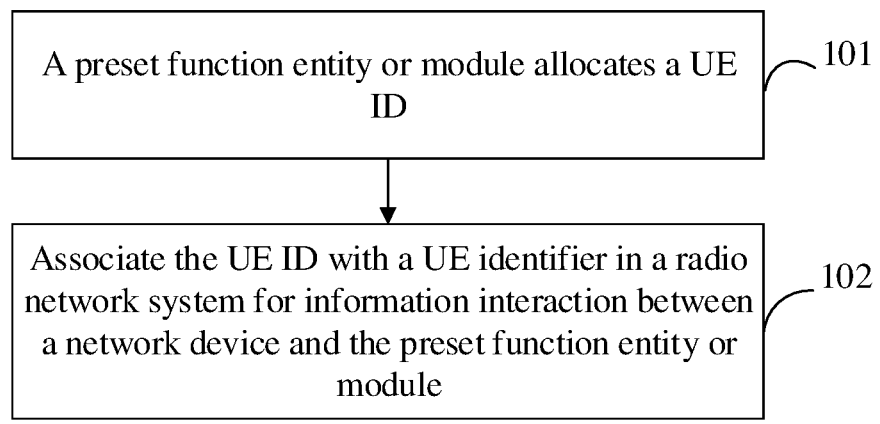
FIG. 1 is a first flowchart of a method for allocating a UE identifier according to an embodiment of the disclosure.

Embodiments of the disclosure provide a method for allocating a UE identifier. As shown in FIG. 1, the method includes the following operations.

In S101, a preset function entity or module allocates a UE identification (ID).

In S102, the UE ID is associated with an identifier of a UE in a radio network system for information interaction between a network device and the preset function entity or module.

The preset function entity or module may be set as $FA_{outside}$, which is different from all function entities in a 5G system. The UE ID may be set as FA UE ID for identifying a UE ID.

In the embodiments of the disclosure, a UE ID is associated with an identifier of a UE in a radio network system, so as to achieve decoupling of the UE ID from a specific network system. By means of a unified UE ID, information between a network device and the preset function entity or module may be conveniently and clearly associated, thereby avoiding the use of a complicated UE ID or identifier in the radio network system.

In the embodiments of the disclosure, the preset function entity or module at least includes:

a near Real Time Radio Intelligent Controller (nRT RIC), and/or a non Real Time Radio Intelligent Controller (NRT RIC), and/or other function entities or modules capable of allocating a UE ID.

In one embodiment, before the preset function entity or module allocates the UE ID, the method further includes the following operations.

A UE identifier request sent by the network device is received.

The request carries an identifier of the UE in the radio network system.

In one embodiment, the method further includes the following operations.

The identifier of the UE in the radio network system sent by the network device is received and stored.

Or, an updated identifier of the UE in the radio network system sent by the network device is received and stored.

In one embodiment, the method further includes the following operations.

A deletion request sent by the network device is received.

The deletion request is used for notifying the preset function entity or module to delete relevant information about the identifier of the UE in the radio network system.

In the embodiments of the disclosure, the UE ID remains unchanged within a coverage of the radio network system managed or controlled by the preset function entity or module.

When the identifier of the UE in the radio network system is changed, the UE ID is associated with an updated identifier.

In the embodiments of the disclosure, the operation that a preset function entity or module allocates a UE ID includes the following operations.

The preset function entity or module determines whether the UE is allocated with the UE ID based on the identifier of the UE in the radio network system. If no, a UE ID is allocated and sent to the network device. If yes, the allocated UE ID is sent, and the identifier of the UE in the radio network system is recorded.

In the embodiments of the disclosure, the operation that a preset function entity or module allocates a UE ID includes the following operations.

The nRT RIC determines whether the UE has been allocated with the UE ID according to the identifier of the UE in the radio network system. If the UE is not allocated with the UE ID, a UE ID is allocated. If the UE has been allocated with the UE ID, the allocated UE ID is used.

The nRT RIC records the identifier of the UE in the radio network system, and sends the UE ID and the identifier of the UE in the radio network system to the NRT RIC together.

In the embodiments of the disclosure, the length of the UE ID is determined according to the total number of UEs to be supported by the preset function entity or module; or, a two-level ID recording mode is adopted.

Figure 2:
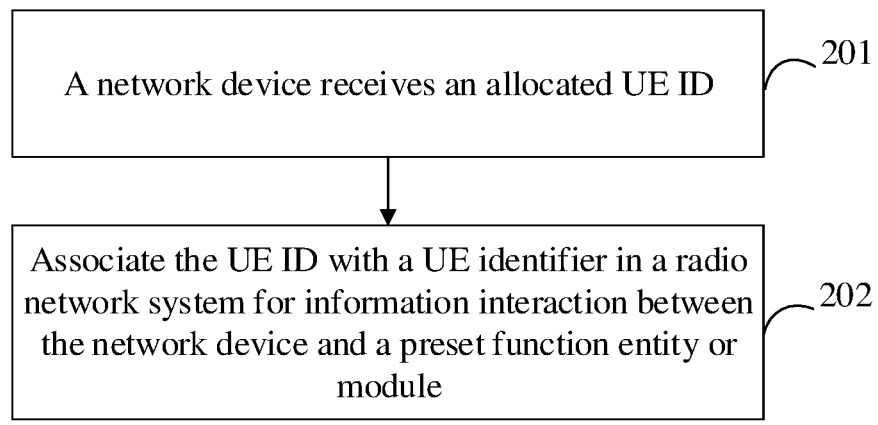
FIG. 2 is a second flowchart of a method for allocating a UE identifier according to an embodiment of the disclosure.

Embodiments of the disclosure also provide a method for allocating a UE identifier. As shown in FIG. 2, the method includes the following operations.

In S201, a network device receives an allocated UE ID.

In S202, the UE ID is associated with an identifier of a UE in a radio network system for information interaction between the network device and a preset function entity or module.

In one embodiment, before the network device receives the allocated UE ID, the method may further include the following operations.

A UE identifier request is sent to the preset function entity or module.

The request carries an identifier of the UE in the radio network system.

In one embodiment, the method further includes the following operations.

The identifier of the UE in the radio network system is sent to the preset function entity or module.

Or, an updated identifier of the UE in the radio network system is sent to the preset function entity or module.

In one embodiment, the method further includes the following operations.

A deletion request is sent to the preset function entity or module when it is determined that the UE is deleted.

The deletion request is used for notifying the preset function entity or module to delete relevant information about the identifier of the UE in the radio network system.

In one embodiment, the method further includes the following operations.

The UE ID is mapped or bound to the identifier of the UE in the radio network system.

Or, the UE ID is mapped or bound to an updated identifier of the UE in the radio network system.

Figure 3:
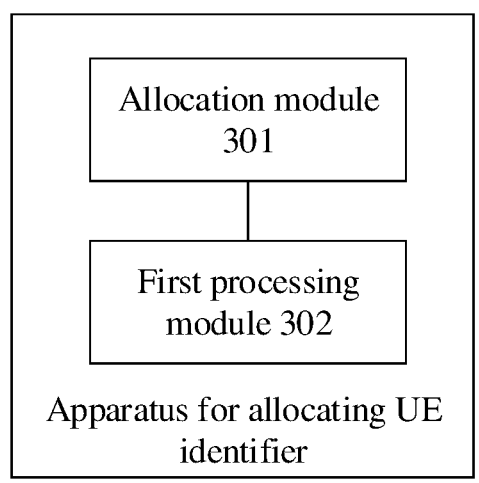
FIG. 3 is a first structural diagram of an apparatus for allocating a UE identifier according to an embodiment of the disclosure.

In order to implement the above-mentioned method embodiments, embodiments of the disclosure also provide an apparatus for allocating a UE identifier. As shown in FIG. 3, the apparatus includes an allocation module 301 and a first processing module 302.

The allocation module 301 is configured to allocate, by a preset function entity or module, a UE ID. The UE ID is associated with an identifier of a UE in a radio network system for information interaction between a network device and the preset function entity or module.

The first processing module 302 is configured to perform the information interaction between the network device and the preset function entity or module.

In the embodiments of the disclosure, the preset function entity or module at least includes:
a near Real Time Radio Intelligent Controller (nRT RIC), and/or a non Real Time Radio Intelligent Controller (NRT RIC), and/or other function entities or modules capable of allocating a UE ID.

Figure 4:
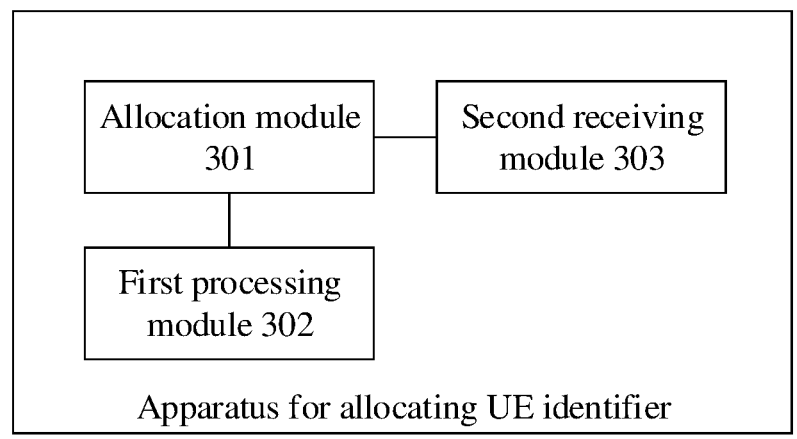
FIG. 4 is a second structural diagram of an apparatus for allocating a UE identifier according to an embodiment of the disclosure.

In one embodiment, as shown in FIG. 4, the apparatus further includes: a second receiving module 303.

Before the allocation module 301 allocates a UE ID, the second receiving module 303 is configured to receive a UE identifier request sent by the network device.

The request carries an identifier of the UE in the radio network system.

In one embodiment, the second receiving module 303 is further configured to: receive and store the identifier of the UE in the radio network system sent by the network device; or, receive and store an updated identifier of the UE in the radio network system sent by the network device.

In one embodiment, the second receiving module 303 is further configured to receive a deletion request sent by the network device.

The deletion request is used for notifying the preset function entity or module to delete relevant information about the identifier of the UE in the radio network system.

In the embodiments of the disclosure, the UE ID remains unchanged within a coverage of the radio network system managed or controlled by the preset function entity or module.

When the identifier of the UE in the radio network system is changed, the UE ID is associated with an updated identifier.

In the embodiments of the disclosure, the operation that the allocation module 301 allocates a UE ID includes the following operations.

It is determined whether the UE is allocated with the UE ID based on the identifier of the UE in the radio network system. If no, a UE ID is allocated and sent to the network device. If yes, the allocated UE ID is sent, and the identifier of the UE in the radio network system is recorded.

In the embodiments of the disclosure, the operation that the allocation module 301 allocates a UE ID includes the following operations.

The allocation module 301 (which may be located in an nRT RIC) determines whether the UE has been allocated with the UE ID according to the identifier of the UE in the radio network system. If the UE is not allocated with the UE ID, a UE ID is allocated. If the UE has been allocated with the UE ID, the allocated UE ID is used.

The identifier of the UE in the radio network system is recorded, and the UE ID and the identifier of the UE in the radio network system are sent to the NRT RIC together.

In the embodiments of the disclosure, the length of the UE ID is determined according to the total number of UEs to be supported by the preset function entity or module; or, a two-level ID recording mode is adopted.

Figure 5:
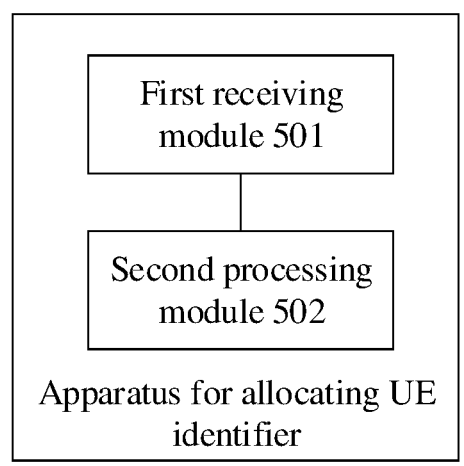
FIG. 5 is a third structural diagram of an apparatus for allocating a UE identifier according to an embodiment of the disclosure.

Embodiments of the disclosure also provide an apparatus for allocating a UE identifier. As shown in FIG. 5, the apparatus includes a first receiving module 501 and a second processing module 502.

The first receiving module 501 is configured to receive, by a network device, an allocated UE ID.

The UE ID is associated with an identifier of a UE in a radio network system for information interaction between the network device and a preset function entity or module.

The second processing module 502 is configured to perform the information interaction between the network device and the preset function entity or module.

Figure 6:
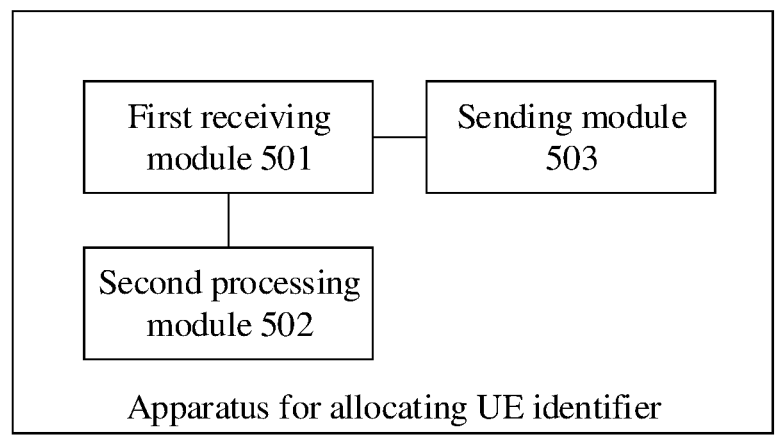
FIG. 6 is a fourth structural diagram of an apparatus for allocating a UE identifier according to an embodiment of the disclosure.

In one embodiment, as shown in FIG. 6, the apparatus further includes: a sending module 503. Before the first receiving module 501 receives an allocated UE ID, the sending module 503 is configured to send a UE identifier request to the preset function entity or module.

The request carries an identifier of the UE in the radio network system.

In one embodiment, the sending module 503 is further configured to: send the identifier of the UE in the radio network system to the preset function entity or module; or, send an updated identifier of the UE in the radio network system to the preset function entity or module.

In one embodiment, the sending module 503 is further configured to send a deletion request to the preset function entity or module when it is determined that the UE is deleted.

The deletion request is used for notifying the preset function entity or module to delete relevant information about the identifier of the UE in the radio network system.

In one embodiment, the first receiving module 501 is further configured to: map or bind the UE ID to the identifier of the UE in the radio network system; or, map or bind the UE ID to an updated identifier of the UE in the radio network system.

Embodiments of the disclosure also provide an information processing apparatus, which includes: a processor and a memory for storing a computer program executable by the processor.

The processor, when executing the computer program, performs the following operations.

A preset function entity or module allocates an FA UE ID.

The UE ID is associated with an identifier of a UE in a radio network system for information interaction between a network device and the preset function entity or module.

The preset function entity or module at least includes:
an nRT RIC, and/or an NRT RIC, and/or other function entities or modules capable of allocating a UE ID.

Before the preset function entity or module allocates a UE ID, the processor, when executing the computer program, further performs the following operations.

A UE identifier request sent by the network device is received.

The request carries an identifier of the UE in the radio network system.

The processor, when executing the computer program, further performs the following operations.

The identifier of the UE in the radio network system sent by the network device is received and stored.

Or, an updated identifier of the UE in the radio network system sent by the network device is received and stored.

The processor, when executing the computer program, further performs the following operations.

A deletion request sent by the network device is received. The deletion request is used for notifying the preset function entity or module to delete relevant information about the identifier of the UE in the radio network system.

The UE ID remains unchanged within a coverage of the radio network system managed or controlled by the preset function entity or module.

When the identifier of the UE in the radio network system is changed, the UE ID is associated with an updated identifier.

When the preset function entity or module allocates a UE ID, the processor, when executing the computer program, further performs the following operations.

The preset function entity or module determines whether the UE is allocated with the UE ID based on the identifier of the UE in the radio network system. If no, a UE ID is allocated and sent to the network device. If yes, the allocated UE ID is sent, and the identifier of the UE in the radio network system is recorded.

When the preset function entity or module allocates a UE ID, the processor, when executing the computer program, further performs the following operations.

The nRT RIC determines whether the UE has been allocated with the UE ID according to the identifier of the UE in the radio network system. If the UE is not allocated with the UE ID, a UE ID is allocated. If the UE has been allocated with the UE ID, the allocated UE ID is used.

The nRT RIC records the identifier of the UE in the radio network system, and sends the UE ID and the identifier of the UE in the radio network system to the NRT RIC together.

The length of the UE ID is determined according to the total number of UEs needing to be supported by the preset function entity or module; or, a two-level ID recording mode is adopted.

Embodiments of the disclosure also provide an information processing apparatus, which includes: a processor and a memory for storing a computer program executable on the processor.

The processor, when executing the computer program, performs the following operations.

A network device receives an allocated UE ID.

The UE ID is associated with an identifier of a UE in a radio network system for information interaction between the network device and a preset function entity or module.

Before the network device receives an allocated UE ID, the processor, when executing the computer program, further performs the following operations.

A UE identifier request is sent to the preset function entity or module.

The request carries an identifier of the UE in the radio network system.

The processor, when executing the computer program, further performs the following operations.

The identifier of the UE in the radio network system is sent to the preset function entity or module.

Or, an updated identifier of the UE in the radio network system is sent to the preset function entity or module.

The processor, when executing the computer program, further performs the following operations.

A deletion request is sent to the preset function entity or module when it is determined that the UE is deleted.

The deletion request is used for notifying the preset function entity or module to delete relevant information about the identifier of the UE in the radio network system.

The processor, when executing the computer program, further performs the following operations.

The UE ID is mapped or bound to the identifier of the UE in the radio network system.

Or, the UE ID is mapped or bound to an updated identifier of the UE in the radio network system.

It should be noted that the apparatus provided by the above embodiments is only exemplified by the division of the above program modules when allocating a UE identifier. In practice, the above processing allocation may be completed by different program modules as required, i.e., an internal structure of a device is divided into different program modules to complete all or part of the above-described processing. In addition, the apparatus provided by the above embodiments and the corresponding method embodiments belong to the same concept, the detailed implementation process thereof is detailed in the method embodiments, and descriptions will be omitted herein.

In an exemplary embodiment, embodiments of the disclosure also provide a computer-readable storage medium. The computer-readable storage medium may be a FRAM, a ROM, a PROM, an EPROM, an EEPROM, a flash memory, a magnetic surface memory, an optical disc, or a CD-ROM, or may also be a variety of devices, such as mobile phones, computers, tablet devices and personal digital assistants, which include one or any combination of the above memories.

Embodiments of the disclosure also provide a computer-readable storage medium having a computer program stored thereon. The computer program, when executed by a processor, performs the following operations.

A preset function entity or module allocates an FA UE ID.

The UE ID is associated with an identifier of a UE in a radio network system for information interaction between a network device and the preset function entity or module.

The preset function entity or module at least includes:
an nRT RIC, and/or an NRT RIC, and/or other function entities or modules capable of allocating a UE ID.

Before the UE ID is allocated, the computer program, when executed by the processor, also performs the following operations.

A UE identifier request sent by the network device is received.

The request carries an identifier of the UE in the radio network system.

The computer program, when executed by the processor, also performs the following operations.

The identifier of the UE in the radio network system sent by the network device is received and stored.

Or, an updated identifier of the UE in the radio network system sent by the network device is received and stored.

The computer program, when executed by the processor, also performs the following operations.

A deletion request sent by the network device is received.

The deletion request is used for notifying the preset function entity or module to delete relevant information about the identifier of the UE in the radio network system.

The UE ID remains unchanged within a coverage of the radio network system managed or controlled by the preset function entity or module.

When the identifier of the UE in the radio network system is changed, the UE ID is associated with an updated identifier.

When the preset function entity or module allocates the UE ID, the computer program, when executed by the processor, also performs the following operations.

The preset function entity or module determines whether the UE is allocated with the UE ID based on the identifier of the UE in the radio network system. If no, a UE ID is allocated and sent to the network device. If yes, the allocated UE ID is sent, and the identifier of the UE in the radio network system is recorded.

When the preset function entity or module allocates the UE ID, the computer program, when executed by the processor, also performs the following operations.

The nRT RIC determines whether the UE has been allocated with the UE ID according to the identifier of the UE in the radio network system. If the UE is not allocated with the UE ID, a UE ID is allocated. If the UE has been allocated with the UE ID, the allocated UE ID is used.

The nRT RIC records the identifier of the UE in the radio network system, and sends the UE ID and the identifier of the UE in the radio network system to the NRT RIC together.

The length of the UE ID is determined according to the total number of UEs needing to be supported by the preset function entity or module; or, a two-level ID recording mode is adopted.

Embodiments of the disclosure also provide a computer-readable storage medium having a computer program stored thereon. The computer program, when executed by a processor, performs the following operations.

A network device receives an allocated UE ID.

The UE ID is associated with an identifier of a UE in a radio network system for information interaction between the network device and a preset function entity or module.

Before the network device receives an allocated UE ID, the computer program, when executed by the processor, also performs the following operations.

A UE identifier request is sent to the preset function entity or module.

The request carries an identifier of the UE in the radio network system.

The computer program, when executed by the processor, also performs the following operations.

The identifier of the UE in the radio network system is sent to the preset function entity or module.

Or, an updated identifier of the UE in the radio network system is sent to the preset function entity or module.

The computer program, when executed by the processor, also performs the following operations.

A deletion request is sent to the preset function entity or module when it is determined that the UE is deleted.

The deletion request is used for notifying the preset function entity or module to delete relevant information about the identifier of the UE in the radio network system.

The computer program, when executed by the processor, also performs the following operations.

The UE ID is mapped or bound to the identifier of the UE in the radio network system.

Or, the UE ID is mapped or bound to an updated identifier of the UE in the radio network system.

The disclosure will be described below in combination with scene embodiments.

In the overall architecture of O-RAN given by the International Union Organization (O-RAN), a near Real Time Radio Intelligent Controller (nRT RIC) and a non Real Time Radio Intelligent Controller (NRT RIC) are introduced.

The NRT RIC and the nRT RIC, as large data-driven radio resource controllers, need to identify a UE according to a UE ID or an identifier of the UE, perform calculation, and generate a control instruction for the UE. How to enable the NRT RIC and the nRT RIC to obtain the UE ID and to associate data of the UE on various protocol layers according to the UE ID under the premise of ensuring the context security of the UE is a problem to be solved urgently.

The present embodiment provides a UE ID allocation process to achieve uniqueness within the coverage service of the nRT RIC or the NRT RIC while ensuring security of the context of the UE.

Since the nRT RIC and the NRT RIC belong to function entities outside the 5G network system, UE context information in the 5G network system cannot be directly configured to the nRT RIC and the NRT RIC, and the interaction therebetween needs to ensure the security of the UE ID defined by the 5G network system.

In the embodiments of the disclosure, $FA_{outside}$ (Function Entity outside 5G system) refers to function entities or modules outside a radio network system, and these function entities or function modules are complementary functions or modules to the functions of the radio network system, or auxiliary functions or modules, such as nRT RIC function entity introduced by O-RAN.

XG UE ID: for the convenience of description, this parameter name is used to uniformly represent all UE IDs or identifiers defined in subsequent generations of network systems, such as 3G/4G/5G and even 6G/7G in the future, including IMSI, MME UE S1AP ID, RAN UE S1AP ID, E-RNTI, etc. in 3G/4G, UE identifiers defined by various 5G systems, such as SUPI, SUCI, 5G-GUPI, 5G-S-TMSI, AMF UE NGAP ID, RAN UE NGAP ID, RAN UE ID, and C-RNTI in 5G.

FA UE ID: UE ID generated by $FA_{outside}$, the FA UE ID being a valid user identity in the whole $FA_{outside}$.

First, a scheme for UE ID interaction between a radio network system and $FA_{outside}$ is given below.

The radio network system includes a base station (gNB) and a CN. When the radio network system interacts with $FA_{outside}$ for the UE ID (representing both FA UE ID and XG UE ID), the interaction may be performed separately by the gNB and the CN or simultaneously by the gNB and the CN.

There are two interaction modes for the UE ID:

1. The radio network system sends an XG UE ID to $FA_{outside}$. After receiving the XG UE ID, $FA_{outside}$ uses the XG UE ID as identification information of a UE to store, identify and process information of the UE, and generates a corresponding control command. The XG UE ID is changed according to the change of the radio network system.

2. The radio network system requests for a UE ID (denoted as FA UE ID) generated by $FA_{outside}$ from $FA_{outside}$. The FA UE ID is a valid user identity in the whole $FA_{outside}$. After obtaining the FA UE ID, the radio network system maps or binds the FA UE ID to the XG UE ID allocated or used inside the radio network system, i.e. the FA UE ID can be indexed by using the XG UE ID. The XG UE ID can be likewise indexed by using the FA UE ID.

When the radio network system interacts with $FA_{outside}$, the FA UE ID is used. When the XG UE ID is changed due to the movement of the UE, for example, a C-RNTI, or a RAN UE ID, or a 5G-S-TMSI needs to be changed due to handover, if the FA UE ID is not changed at this moment, the radio network system automatically completes the mapping or binding of the FA UE ID to a new XG UE ID. The FA UE ID is not changed within the coverage of a radio network system managed or controlled by $FA_{outside}$. When $FA_{outside}$ needs to be changed, the radio network system completes a new mapping or binding of the FA UE ID to the XG UE ID.

In the embodiments of the disclosure, the conditions for UE ID interaction triggering may be the followings.

When a user newly accesses a network, for example, after completing an RRC Connection procedure, UE context has been established completely. At this moment, the radio network system may actively initiate a UE ID interaction procedure.

When a user needs to update a UE ID due to handover, regardless of FA UE ID or XG UE ID, the radio network system may actively initiate a UE ID interaction procedure.

In the embodiments of the disclosure, the signaling process of UE ID interaction may be the followings.

An existing interaction flow between $FA_{outside}$ and the radio network system is selected to carry a corresponding UE ID.

Or, a new flow dedicated to UE ID interaction may be defined.

In the embodiments of the disclosure, when the UE is deleted, the radio network system needs to timely notify $FA_{outside}$ to delete the recorded UE ID-related information.

In the embodiments of the disclosure, when the XG UE ID of the radio network system changes due to the movement of the UE, an update process of the UE ID is initiated between $FA_{outside}$ and the radio network system.

The above UE ID interaction procedure may use an existing flow of interaction between $FA_{outside}$ and the radio network system, or a new flow may be defined. The existing flow such as an RIC subscription request is used.

Figure 7:
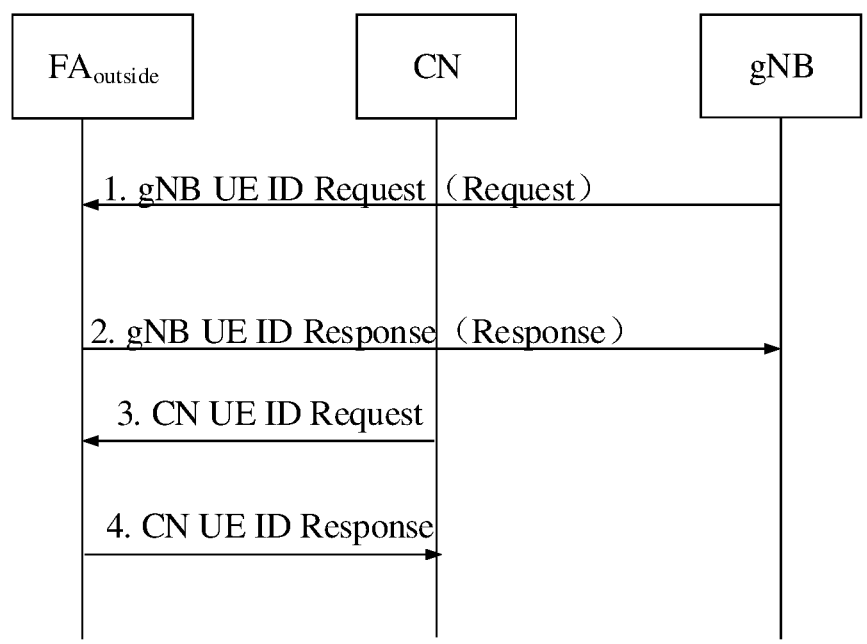
FIG. 7 is a flowchart of interaction of a UE ID according to an embodiment of the disclosure.

FIG. 7 shows a flowchart of UE ID interaction. In the UE context establishment process, a gNB establishes the UE context establishment earlier than a CN. Therefore, the gNB first sends a UE ID in a radio network system to $FA_{outside}$. When the CN sends a UE ID to $FA_{outside}$, $FA_{outside}$ already has the context of a user. When an AMF UE NGAP ID or RAN UE NGAP ID changes due to movement of the user, such as handover between base stations, the RAN UE NGAP ID changes. At this moment, the gNB or CN needs to send a UE ID update application to $FA_{outside}$. When the UE is deleted, the gNB needs to send a user context deletion request to $FA_{outside}$.

In S1, after completing the context establishment of the UE, the gNB sends a UE ID request to $FA_{outside}$ It may carry an identity number or identification information of the gNB, such as a gNB ID.

In S2, $FA_{outside}$ sends a feedback response to the gNB.

In S3, after completing the UE context establishment and acknowledgement between the CN and the gNB, the CN sends a UE ID request to $FA_{outside}$ It may carry an identity number or identification information of the CN, such as a CN ID.

In S4, $FA_{outside}$ sends a feedback response to the CN.

Here, if the manner that $FA_{outside}$ defines an FA UE ID is employed, the flow of FIG. 7 is specifically as follows.

In S1, after the context of a UE is established in a gNB, the gNB sends a UE ID request to $FA_{outside}$. At this moment, the gNB may carry an AMF UE NGAP ID or RAN UE NGAP ID to $FA_{outside}$, or may carry a gNB ID.

In S2, after receiving the request sent by the gNB, $FA_{outside}$ determines that the UE is not allocated with an FA UE ID according to the AMF UE NGAP ID or RAN UE NGAP ID, and then sends the allocated FA UE ID to the gNB. If the UE has allocated with an FA UE ID, $FA_{outside}$ sends the allocated FA UE ID, and records the AMF UE NGAP ID or RAN UE NGAP ID corresponding to the UE. If a gNB ID is carried, the gNB ID needs to be recorded.

In S3, after completing the UE context establishment and acknowledgement between the CN and the gNB, the CN sends a UE ID request to $FA_{outside}$. At this moment, the CN may carry the AMF UE NGAP ID to $FA_{outside}$. If a CN ID is carried, the CN ID needs to be recorded.

In S4, after receiving the request sent by the CN, $FA_{outside}$ performs UE identity query according to the AMF UE NGAP ID. If it is confirmed that the UE identified by the AMF UE NGAP ID has been allocated with the FA UE ID, $FA_{outside}$ sends the FA UE ID to the CN in a response sent to the CN.

Second, UE ID allocation and management schemes of $FA_{outside}$ are given below.

$FA_{outside}$ may generate an FA UE ID applicable to $FA_{outside}$ per se after receiving a request from a radio network system.

The length of the FA UE ID is determined according to the total number of UEs to be supported by $FA_{outside}$. For example: if the total number of supported UEs does not exceed 60,000, the length may be defined as 2 bytes (16 bits). If the total number of supported UEs exceeds 65,000, the length may be defined as 4 bytes (32 bits). Of course, the FA UE ID may also adopt a two-level ID recording mode, i.e. adopt the mode of CN ID+FA UE ID or gNB ID+FA UE ID, which is advantageous for compressing the length of the FA UE ID. If the mode of CN ID+FA UE ID is adopted, the FA UE ID identifies all users in a CN network, and a length of 4 bytes is enough.

Figure 8:
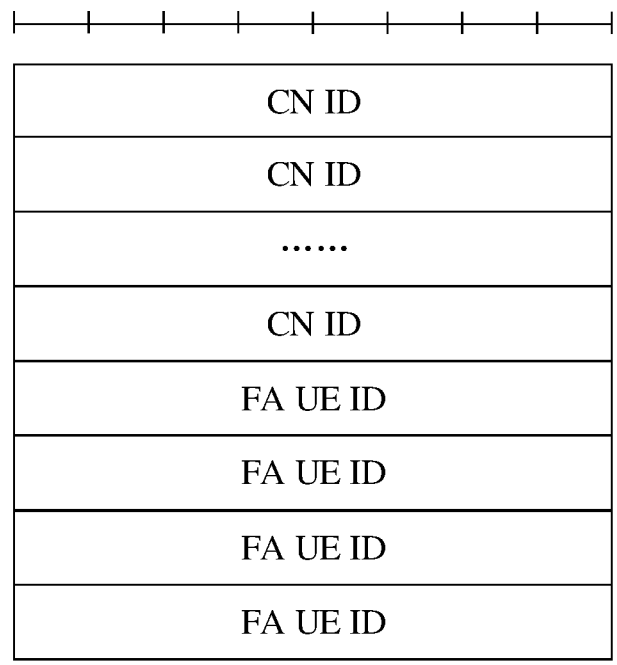
FIG. 8 is a format diagram of a FA UE ID according to an embodiment of the disclosure.

The CN ID+FA UE ID format is shown in FIG. 8, so that an ID identifying the whole UE identity is formed by connecting two identifiers.

The current UE ID interaction between an NRT RIC, an nRT RIC and a 5G radio communication system defined by O-RAN is illustrated as an example. $FA_{outside}$ includes the NRT RIC and the nRT RIC, and the 5G communication system includes a CN and a gNB.

Figure 9:
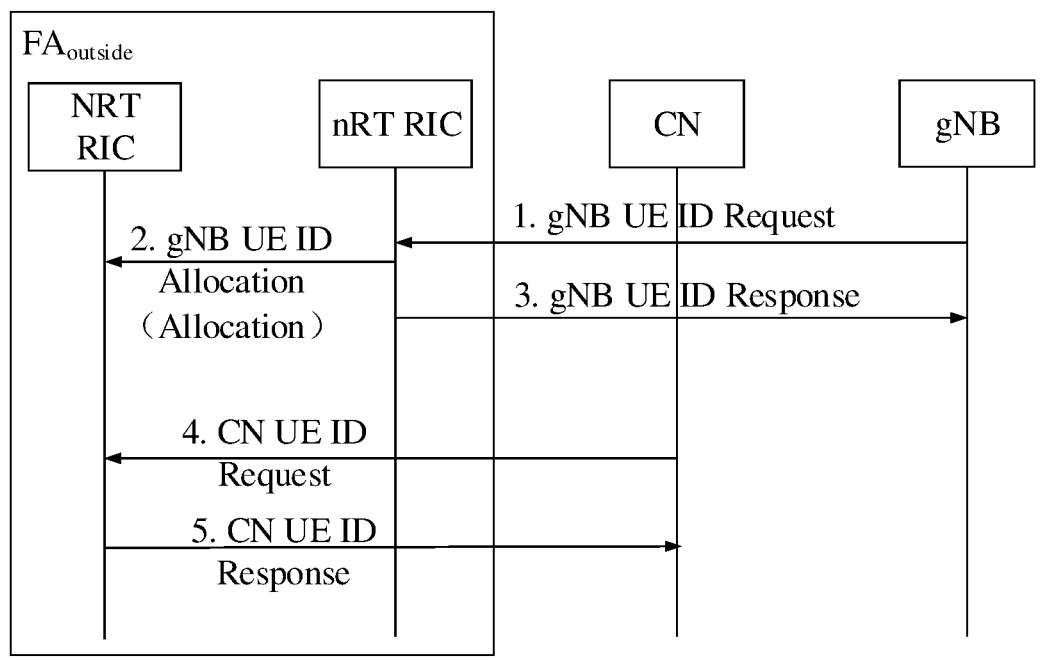
FIG. 9 is a flowchart of interaction of a UE ID between an NRT RIC and an nRT RIC according to an embodiment of the disclosure.

As shown in FIG. 9, an interaction flowchart is as follows, including the following steps.

In S1, after the context of a UE is established in the gNB, the gNB sends a UE ID request to the nRT RIC. At this moment, the gNB may carry an AMF UE NGAP ID or RAN UE NGAP ID to the nRT RIC, or may carry a gNB ID.

In S2, after receiving the request sent by the gNB, the nRT RIC determines whether the UE is allocated with an FA UE ID according to the AMF UE NGAP ID or RAN UE NGAP ID. If the UE is not allocated with an FA UE ID, an FA UE ID is allocated. If an FA UE ID has been allocated, the allocated FA UE ID is used. Then, the nRT RIC sends the FA UE ID and the AMF UE NGAP ID, or the FA UE ID and the RAN UE NGAP ID together to the NRT RIC; and sends the gNB ID together to the NRT RIC if the base station sends a gNB ID. The nRT RIC records the AMF UE NGAP ID or RAN UE NGAP ID corresponding to the UE. If a gNB ID is carried, the gNB ID needs to be recorded.

In S3, the nRT RIC sends the FA UE ID to the gNB.

In S4, after completing the context establishment and acknowledgement of the UE between the CN and the gNB, the CN sends a UE ID request to the NRT RIC. At this moment, the CN may carry the AMF UE NGAP ID to the NRT RIC. The NRT RIC compares the AMF UE NGAP ID sent by the nRT RIC with the AMF UE NGAP ID sent by the CN. If the IDs are the same, the IDs belong to the same user. Then, the FA UE ID corresponding to the AMF UE NGAP ID is configured to the CN. If a CN ID is carried, the CN ID needs to be recorded.

In S5, the NRT RIC allocates the FA UE ID to the CN.

When handover occurs to a UE, if it is an inter-gNB handover or an inter-CN handover, a RAN UE NGAP ID or AMF UE NGAP ID needs to be changed. At this moment, the gNB or the CN timely notifies the nRT RIC or NRT RIC to update the two parameters. The FA UE ID may not be modified.

Third, the method of interaction between a CN and a gNB for an FA UE ID is given below.

There are two methods for the CN to obtain the FA UE ID. In one method, as shown in FIG. 9, the CN applies directly to the NRT RIC. In the other method, the gNB sends the obtained FA UE ID to the CN, as shown in FIG. 10.

Figure 10:
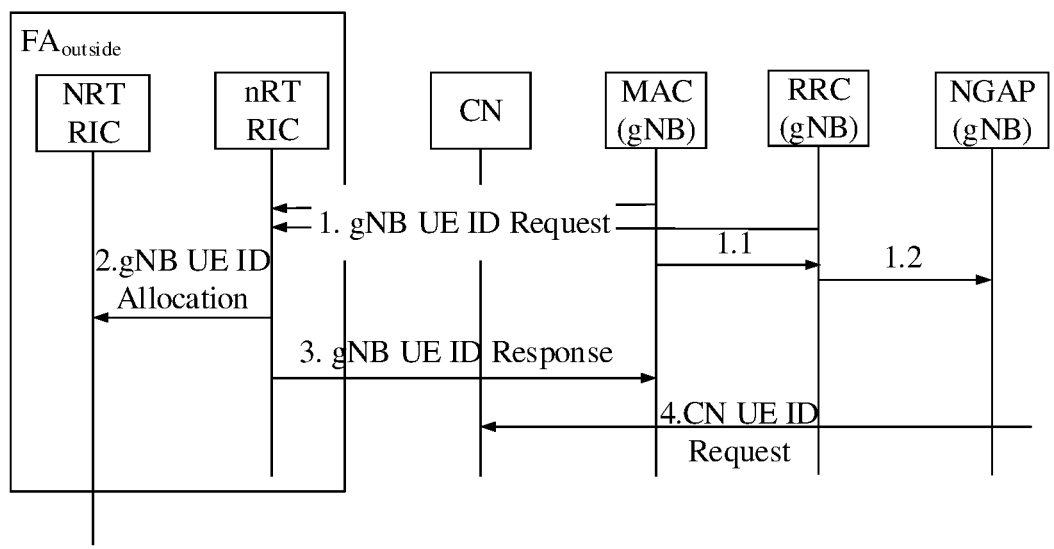
FIG. 10 is a flowchart of obtaining an FA UE ID by a CN according to an embodiment of the disclosure.

FIG. 10 shows a flowchart of a gNB sending an FA UE ID to a CN.

In S1, when a UE completes a random access procedure, such as contention resolution, an MAC layer or RRC layer of a gNB initiates an FA UE ID application process to an nRT RIC. If an application process is initiated by an MAC, after obtaining an FA UE ID, the MAC reports the FA UE ID to an RRC (1.1 in FIG. 10). After obtaining the FA UE ID, the RRC sends the FA UE ID to an NgAP on a gNB side (1.2 in FIG. 10). S2 and S3 are the same as those of FIG. 9.

In S4, after the gNB obtains an FA UE ID allocated by the nRT RIC, the NgAP sends the FA UE ID to an AMF of a CN. The NgAP sends the FA UE ID to the AMF during bearer establishment on an Ng interface.

An FA UE ID may be added to the following flow in the protocol as shown in the following list of UE-related NG logical connections.

This IE contains a list of UE-associated logical NG-connections.

| IE/Group Name | Presence | Range | IE type and reference | Semantics description |
|---|---|---|---|---|
| UE-associated Logical NG-connection Item | | 1 ... <maxnoofNGConnectionsToReset> | | |
| >AMF UE NGAP ID | O | | 9.3.3.1 | |
| >RAN UE NGAP ID | O | | 9.3.3.2 | |
| >FA UE ID | O | | | |

Through the above process, the binding of the FA UE ID with the AMF UE NGAP ID and the RAN UE NGAP ID can be achieved. After an NGAP on a CN side obtains an FA UE ID through the process, the NGAP sends the FA UE ID and a TMSI or 5G-S-TMSI or 5G-GUTI inside the CN to the AMF, and the AMF allocates the FA UE ID to various function entities such as an SMF and a UPF.

When the CN or the gNB needs to interact with the nRT RIC and the NRT RIC, the FA UE ID is used in either situation. When an AMF UE NGAP ID or RAN UE NGAP ID is changed, the gNB reports updates to the nRT RIC in time. Upon receiving the updates, the nRT RIC notifies the NRT RIC of synchronous updates. Meanwhile, information or data of the nRT RIC/NRT RIC indexed by the FA UE ID does not need to be discarded, and is continuously stored and used.

In case of handover of the UE during movement and the AMF UE NGAP ID or RAN UE NGAP ID needs to be changed, the FA UE ID is sent from a source base station or source CN to a destination base station or destination CN. On the destination base station or CN, the AMF UE NGAP ID or RAN UE NGAP ID is re-allocated. At this moment, the target gNB initiates an ID update process to notify the nRT RIC or NRT RIC to update the recorded AMF UE NGAP ID or RAN UE NGAP ID, or may carry a new AMF UE NGAP ID or RAN UE NGAP ID in a measurement information report.

In the embodiments of the disclosure, the FA UE ID is associated with the AMF UE NGAP ID or RAN UE NGAP ID, so as to realize decoupling between the FA UD ID and a specific network system. Regardless of a 5G network system, a 4G network system, or even a 3G system, it is possible to bind the FA UE ID with the ID of the UE on an interface between the CN and the base station. Information sent by the CN and the gNB to the NRT RIC/nRT RIC are associated with each other through the FA UE ID.

When the AMF UE NGAP ID or RAN UE NGAP ID is changed, the FA UE ID may not be changed, and only needs to be bound to a new AMF UE NGAP ID or RAN UE NGAP ID. The information reported to $FA_{outside}$ by the CN and the gNB can be conveniently and clearly associated through the unified FA UE ID, thereby avoiding the use of a complicated UE ID or identifier defined by a radio network system.

An independent FA UE ID in the embodiments of the disclosure not only avoids the security impact caused by a UE identifier allocated by the 5G network system being sent out of the system, but also avoids the frequent change caused by the locality of the UE identifier allocated by the 5G network system (e.g. the UE identifier being changed for each cell, the UE identifier being changed for each base station, etc.).

Through the embodiments of the disclosure, an AMF UE NGAP ID or RAN UE NGAP ID is associated with an FA UE ID. Since the two above IDs do not affect the security of the UE and the two IDs are respectively of a CN level and a gNB level, and the change granularity caused by handover is low.

The above descriptions are only preferred embodiments of the disclosure and are not intended to limit the protection scope of the disclosure.

The invention claimed is:

1. A method for allocating a User Equipment (UE) identifier, comprising:
    allocating, by a preset function entity or module, a UE Identification (UE ID);
    wherein the UE ID is associated with an identifier of a UE in a radio network system and is used for information interaction between a network device and the preset function entity or module;
    wherein the identifier of the UE in the radio network system comprises any UE ID or identifier defined in a mobile network system comprising a 3rd-Generation (3G) network system, a 4th-Generation (4G) network system, or a 5th-Generation (5G) network system, wherein the identifier of the UE in the radio network system is changed according to a change of the radio network system; and
    wherein the preset function entity or module comprises at least one of: a near Real Time Radio Intelligent Controller (nRT RIC) or a non Real Time Radio Intelligent Controller (NRT RIC).

2. A non-transitory computer-readable storage medium, having a computer program stored thereon that, when executed by a processor, performs steps of the method according to claim 1.

3. The method according to claim 1, wherein before the preset function entity or module allocates the UE ID, the method further comprises:
    receiving a UE identifier request sent by the radio network system,
    the UE identifier request carrying the identifier of the UE in the radio network system.

4. The method according to claim 1, further comprising:
    receiving and storing the identifier of the UE in the radio network system sent by the network device; or
    receiving and storing an updated identifier of the UE in the radio network system sent by the network device.

5. The method according to claim 1, further comprising:
    receiving a deletion request sent by the network device,
    the deletion request being used for notifying the preset function entity or module to delete relevant information about the identifier of the UE in the radio network system.

6. The method according to claim 1, wherein the UE ID remains unchanged within a coverage of the radio network system managed or controlled by the preset function entity or module; and
    when the identifier of the UE in the radio network system is changed, the UE ID is associated with an updated identifier.

7. The method according to claim 1, wherein allocating, by the preset function entity or module, the UE ID comprises:
    determining, by the preset function entity or module, whether the UE is allocated with the UE ID based on the identifier of the UE in the radio network system;
    when the UE is not allocated with the UE ID based on the identifier of the UE in the radio network system, allocating the UE ID and sending the UE ID to the network device; and
    when the UE is allocated with the UE ID based on the identifier of the UE in the radio network system, sending the UE ID and recording the identifier of the UE in the radio network system.

8. The method according to claim 1, wherein allocating, by the preset function entity or module, the UE ID comprises:
    determining, by the nRT RIC, whether the UE has been allocated with the UE ID according to the identifier of the UE in the radio network system;
    when the UE has not been allocated with the UE ID, allocating the UE ID; and
    when the UE has been allocated with the UE ID, using the UE ID; and
    recording, by the nRT RIC, the identifier of the UE in the radio network system, and sending the UE ID and the identifier of the UE in the radio network system to the NRT RIC together.

9. The method according to claim 1, wherein a length of the UE ID is determined according to a total number of UEs to be supported by the preset function entity or module; or
    a two-level Identification (ID) recording mode is adopted.

10. A method for allocating a User Equipment (UE) identifier, comprising:

receiving, by a network device, an allocated UE Identification (UE ID);

wherein the allocated UE ID is associated with an identifier of a UE in a radio network system and is used for information interaction between the network device and a preset function entity or module;

wherein the identifier of the UE in the radio network system comprises any UE ID or identifier defined in a mobile network system comprising a 3rd-Generation (3G) network system, a 4th-Generation (4G) network system, or a 5th-Generation (5G) network system, wherein the identifier of the UE in the radio network system is changed according to a change of the radio network system; and wherein the preset function entity or module comprises at least one of: a near Real Time Radio Intelligent Controller (nRT RIC) or a non Real Time Radio Intelligent Controller (NRT RIC).

11. The method according to claim 10, wherein before the network device receives the allocated UE ID, the method further comprises:

sending a UE identifier request to the preset function entity or module, the UE identifier request carrying the identifier of the UE in the radio network system.

12. The method according to claim 10, further comprising:

sending the identifier of the UE in the radio network system to the preset function entity or module; or sending an updated identifier of the UE in the radio network system to the preset function entity or module.

13. The method according to claim 10, further comprising:

sending a deletion request to the preset function entity or module when determining that the UE is deleted, the deletion request being used for notifying the preset function entity or module to delete relevant information about the identifier of the UE in the radio network system.

14. The method according to claim 10, further comprising:

mapping or binding the allocated UE ID to the identifier of the UE in the radio network system; or mapping or binding the allocated UE ID to an updated identifier of the UE in the radio network system.

15. A network device, comprising: a processor and a memory for storing a computer program executable by the processor, wherein the processor is configured to, when executing the computer program, perform steps of the method according to claim 10.

16. A non-transitory computer-readable storage medium, having a computer program stored thereon that, when executed by a processor, performs steps of the method according to claim 10.

17. A preset function entity or module, comprising: a processor and a memory for storing a computer program executable by the processor, wherein the processor is configured to, when executing the computer program:

allocate a User Equipment Identification (UE ID);

wherein the UE ID is associated with an identifier of a UE in a radio network system and is used for information interaction between a network device and the preset function entity or module;

wherein the identifier of the UE in the radio network system comprises any UE ID or identifier defined in a mobile network system comprising a 3rd-Generation (3G) network system, a 4th-Generation (4G) network system, or a 5th-Generation (5G) network system, wherein the identifier of the UE in the radio network system is changed according to a change of the radio network system; and wherein the preset function entity or module comprises at least one of: a near Real Time Radio Intelligent Controller (nRT RIC) or a non Real Time Radio Intelligent Controller (NRT RIC).

18. The preset function entity or module according to claim 17, wherein before allocating the UE ID, the processor is further configured to:

receive a UE identifier request sent by the radio network system, the UE identifier request carrying the identifier of the UE in the radio network system.

* * * * *